March 15, 1938.  A. MORGAN  2,111,294

MECHANISM FOR CONTROLLING THE CLUTCHES OF MOTOR VEHICLES

Filed June 12, 1931  2 Sheets-Sheet 2

Inventor:
Alfred Morgan
by
Frank Reinhow
Attorney.

Patented Mar. 15, 1938

2,111,294

UNITED STATES PATENT OFFICE 2,111,294

MECHANISM FOR CONTROLLING THE CLUTCHES OF MOTOR VEHICLES

Alfred Morgan, Berlin-Charlottenburg, Germany, assignor to Bendix Aviation Corporation, Chicago, Ill., a corporation of Delaware Application June 12, 1931, Serial No. 543,816
In Germany June 14, 1930

5 Claims. (Cl. 192—.01)

My invention relates to improvements in mechanisms for controlling the clutches of motor vehicles, and more particularly in mechanisms of the type in which the suction in the manifold of the engine is used for operating the clutch. One of the objects of the improvements is to provide a clutch controlling mechanism of this type in which the clutch is operated by the suction within the manifold in the same way as it is usually controlled by the attendant operating the clutch pedal, the improved controlling mechanism being constructed so that the clutch is rapidly released, while the clutch closing movement is performed with a certain retardation. With this object in view my invention consists in providing the clutch operating mechanism with a brake which is inoperative during the clutch releasing stroke, and which is thrown into operation during the clutch closing stroke. In the preferred construction the said brake is constructed so that it is operative only during the last part of the clutch closing stroke and when the friction surfaces of the clutch are about to get into engagement with each other, so that the pressure on and the friction of the said friction surfaces are gradually increased.

With this and other objects in view my invention consists in the matters to be described hereinafter and particularly pointed out in the appended claims.

Figure 2:
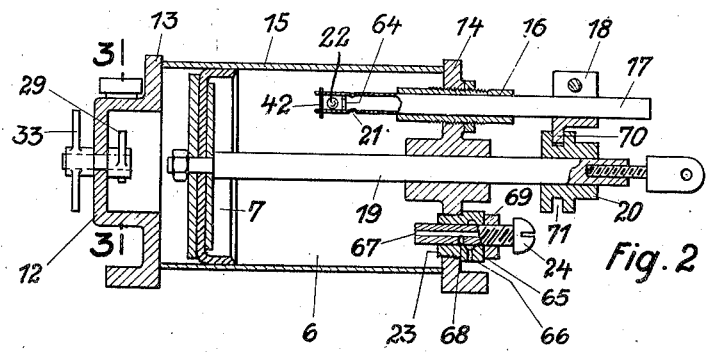
Figure 3:
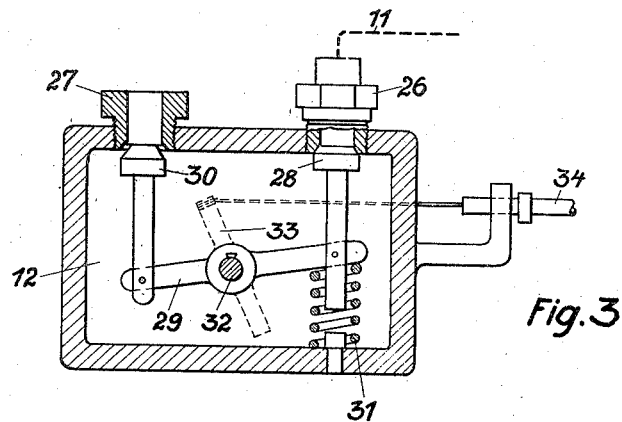
Figure 6:
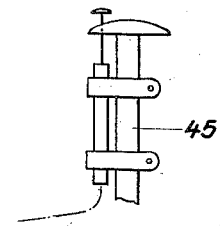
Figure 4:
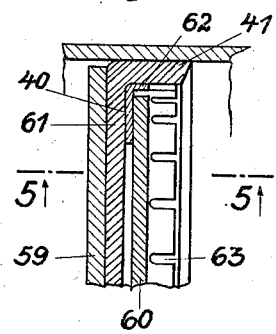
Figure 5:
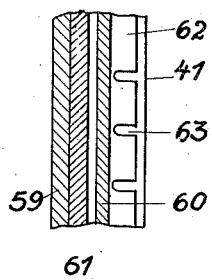

For the purpose of explaining the invention an example embodying the same has been shown in the accompanying drawings in which the same reference characters have been used in all the views to indicate corresponding parts. In said drawings, Fig. 1 is an elevation partly in section showing the front part of the motor vehicle, a part of the engine and its manifold, and the clutch controlling mechanism, Fig. 2 is a sectional elevation showing the clutch controlling cylinder and its piston, Fig. 3 is a sectional elevation on a larger scale taken on the line 3—3 of Fig. 2, Fig. 4 is a detail sectional view showing a part of the piston, Fig. 5 is a sectional view taken on the line 5—5 of Fig. 4 viewed in the direction of the arrows, and Fig. 6 is an elevation showing a modification in which the clutch controlling mechanism is controlled from the gear shifting lever.

Figure 1:
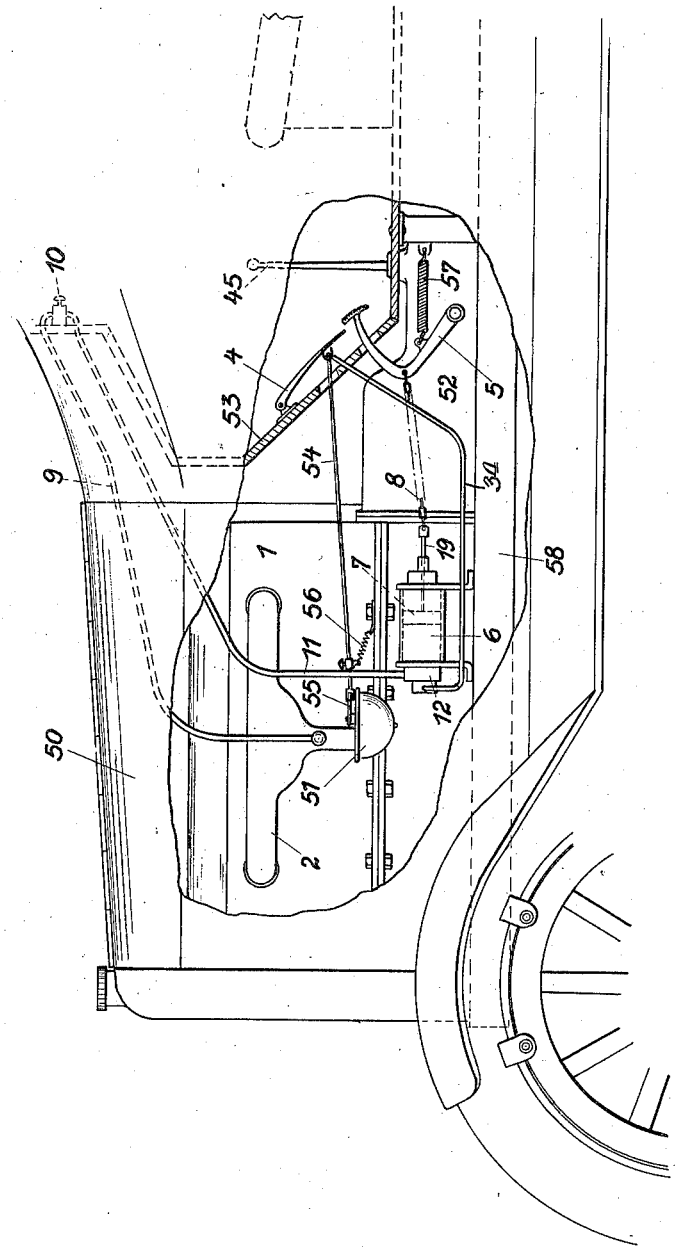

In the figures I have generally indicated the forward portion of an automobile at 50 in Fig. 1, the engine being shown at 1, the intake manifold at 2, the carburetor at 51, the clutch housing at 52, the clutch pedal at 5 and a gear shifting lever at 45.

The clutch pedal projects through the foot board 53, upon which is also mounted an accelerator pedal 4 having a stem 54 connected with the throttle arm 55 of the carburetor, and normally held in retracted position by a spring 56. The clutch pedal 5 is acted upon by a spring 57 tending to retract the said pedal into clutch closing position.

On a part 58 of the frame or another part of the automobile a cylinder 6 is mounted in which a piston 7 has reciprocating movement, the piston rod 19 of which is connected by a chain 8 with the clutch pedal 5.

The cylinder 6 comprises two heads 13 and 14 and a cylindrical wall 15. The head 13 is formed with a valve casing 12 which is provided at its top with a bushing 27 communicating with the outer air and a bushing 26 connected with a pipe 11, the said pipe being connected by a pipe 9 with the manifold 2. The pipes 11, 9 include a valve 10 located at the front board and adapted to disconnect the pipe 11 and the cylinder 6 from the manifold 2. The bushings 26, 27 are controlled by valve cones 28 and 30 mounted on a lever 29 secured to a rock shaft 32, a spring 31 being provided, which normally forces the valve cone 28 on its seat and opens the valve 30. The rock shaft 32 carries an arm 33 which is connected by suitable means such as a Bowden cable 34 with the accelerator 4.

By the valve mechanism just described the left hand end of the cylinder 6 may be connected either to the outer air or to the manifold.

The piston 7 comprises two plates 59 and 60 adapted to clamp a disk of rubber or leather 61 having a flange 41 between the same, and between the plate 60 and the disk 61 a ring 40 formed with a flange 62 of elastic material such as sheet steel is interposed, the flange 62 being provided about its circumference with slots 63. By reason of its elasticity the flange 62 forces the flange 41 outwardly and into tight engagement with the cylindrical wall 15.

In a sleeve 16 extending through the head 14 of the cylinder 6 a pipe 17 has reciprocating movement, which pipe is open at its outer end, and which is provided at its inner end with holes 21. Thus the right hand part of the cylinder communicates with the outer air. Further, at the inner end of the pipe 17 a check valve is provided, which comprises a seat 64 and a spherical valve held in position by a transverse pin 42.

To the outer end of the pipe 17 a clamping member 18 is fixed a finger 70 of which engages in a circumferential groove 71 of a ring 20 secured to the piston rod 19. The clamping member 18 may be set in different positions longitudinally of the pipe 17.

To the head 14 a bushing 23 is secured which is internally formed with a circumferential groove 65 communicating with the outer air through a vent 66, and into the bushing 23 a screw 24 is screwed which is formed with an axial bore 67 communicating with the groove 65 through a vent 68. By screwing the screw more or less into the bushing 23 the flow of air through the bore 67, the vent 68, the groove 65 and the vent 66 is controlled. After setting the screw 24 it is fixed in position by means of a nut 69.

The operation of the controlling mechanism is as follows:

While the engine and the motor car are out of operation the levers 4 and 5 are retracted by their respective springs, and the accelerator 4 sets the valves 28 and 30 through the intermediary of the Bowden cable 34 into the positions, in which the pipe 11 communicates with the valve casing 12, and the valve 30 closes the bushing 27. The piston 7 is in its right hand end position and it is held in this position by the spring 57 acting on the clutch pedal 5.

When the engine is started the suction produced in the manifold 2 is transmitted through the pipes 9 and 11 to the valve casing 12 and the left hand part of the cylinder 6. Thereby the piston is shifted to the left and the clutch is set into disengaged position. Now the engine runs under no load. For starting the car, the gears are shifted to the desired position by the gear shifting lever 45, and the accelerator is rocked into position for admitting gas to the carbureter. At the beginning of the movement of the accelerator, and before gas is admitted to the carbureter the valves 28 and 30 are operated through the intermediary of the cable 34, so that the valve casing 12 is disconnected from the manifold 2 and connected with the outer air. Therefore the clutch pedal is rocked by the spring 57 to the right and into position for closing the clutch. By the said movement the air is pressed from the right hand part of the cylinder 6 and through the bores 21 and the pipe 17 to the outer air, and during the first part of the movement the piston 7 is not materially obstructed. Near the end of the stroke of the piston the pipe 17 is brought into the position in which the bores 21 are closed by the inner end of the sleeve 16 and the valve 22 is forced on its seat. Thus the pipe 17 is closed, and there is only obstructed escape of air through the bore of the screw 24. The pipe 17 is set relatively to the piston rod 19 by means of the clamping member 18 so that the retarding movement of the piston begins when the friction surfaces of the clutch are about to get into engagement with each other. Therefore the clutch is gradually applied.

When it is desired to shift the gears the attendant releases the accelerator, so that the valves 28, 30 are set into position for connecting the cylinder 6 with the intake manifold. Therefore the piston 7 is shifted to the left and into the position shown in Fig. 2, and the clutch is released. It will be understood that the said return movement of the piston is unobstructed, because at the beginning of the movement of the piston to the left the valve 22 is unseated by the air rushing into the cylinder through the pipe 17. After the gears have been shifted the accelerator is again depressed, so that the valve casing 12 is again disconnected from the accelerator and connected with the outer air, and the clutch lever 5 is free to move to the right and into position for closing the clutch, the said movement being again retarded near the end of the stroke of the piston as has been described above.

The engine controlled clutch operating mechanism may be thrown out of operation by means of the valve 10, in which case the clutch is operated by the foot of the attendant.

Under certain circumstances for example in freight motor cars and motor driven omnibuses, which rely on instantaneous braking by means of the engine it is not desirable to disconnect the motor from the gearing. In such cases I prefer to operate the valves 28, 30 from the gear shifting lever 45. As is shown in Fig. 6 the Bowden cable 34 is connected to the said lever, and it is formed with a head by means of which the cable is operated when the attendant places his hand on the lever 45 for shifting the gears. Thus the valve 28 is opened and the clutch released only as long as the gears are being shifted. After the gears have been shifted and the lever 45 released, the valves 28, 30 are returned into initial position in which the clutch is closed by the spring 57. From the foregoing description of the operation of the clutch mechanism it will be understood that the clutch is rapidly operated during the clutch releasing stroke and the major part of the clutch applying stroke. Therefore the coupling and uncoupling operation are performed within a minimum of time. This is important when the clutch is operated for shifting the gears, because the period of time needed for shifting the gear and disconnecting the engine from the wheels and therefore the loss of speed of the vehicle are reduced to a minimum.

By providing two separate valves and the controlling mechanism thereof described herein the sucking action on the piston 7 is rapidly started, because the valve 28 is opened while the accelerator is released. The rapidity of the operation is further increased by providing mechanism for simultaneously operating both valves 28 and 30. A flow of air from one valve to the other is practically impossible, because the bushings 26 and 27 are spaced from each other. By disposing the valves in a chamber 12 forming a part of the cylinder the volume of air to be drawn from the cylinder by suction is reduced as far as possible, so that the clutch is thrown into disengaged position at high velocity.

If it is desired to make use of the braking action of the engine, while the accelerator has been set into position for interrupting the main supply of gas at the accelerator, for example when the vehicle is driving down grade, the valve 10 is closed for disconnecting the intake manifold 2 from the cylinder 6. Therefore, when the accelerator is released, the clutch is not automatically set into disengaged position.

I claim:

1. In a motor vehicle, the combination, with the engine and its manifold, the accelerator, and the clutch mechanism, of a cylinder closed at both ends and having a piston reciprocating therein, a tubular connection between said cylinder at one side of the piston and said manifold, an operative connection between said piston and the clutch mechanism, means adapted to be controlled by the attendant for opening and closing said tubular connection, a sleeve parallel to the axis of said cylinder extending into the chamber of the cylinder located at the side opposite to the part communicating with said manifold, a pipe slidable in said sleeve and having circumferential openings at its inner end and connected with said piston for being movable therewith into position in which said openings are closed by said sleeve, and a vent extending into said chamber.

2. In a motor vehicle, the combination, with the engine and its manifold, the accelerator, and the clutch mechanism, of a cylinder closed at both ends and having a piston reciprocating therein, a tubular connection between said cylinder at one side of the piston and said manifold, an operative connection between said piston and the clutch mechanism, means adapted to be controlled by the attendant for opening and closing said tubular connection, a sleeve parallel to the axis of said cylinder extending into the chamber of the cylinder located at the side opposite to the part communicating with said manifold, a pipe slidable in said sleeve and having circumferential openings at its inner end having axially adjustable connection with said piston for being movable therewith into position in which said openings are closed by said sleeve, and a vent extending into said chamber.

3. In a motor vehicle, the combination, with the engine and its manifold, the accelerator, and the clutch mechanism, of a cylinder closed at both ends and having a piston reciprocating therein, a tubular connection between said cylinder at one side of the piston and said manifold, an operative connection between said piston and the clutch mechanism, means adapted to be controlled by the attendant for opening and closing said tubular connection, a sleeve parallel to the axis of said cylinder extending into the chamber of the cylinder located at the side opposite to the part communicating with said manifold, a pipe slidable in said sleeve and having circumferential openings at its inner end and having axially adjustable connection with said piston for being movable therewith into position in which said openings are closed by said sleeve, a check valve in said pipe internally of said holes constructed for permitting the admission of air through said pipe into said chamber, and a vent extending into said chamber.

4. In a motor vehicle, the combination, with the engine and its manifold, the accelerator, and the clutch mechanism, of a cylinder closed at both ends and having a piston reciprocating therein, a tubular connection between said cylinder at one side of the piston and said manifold, an operative connection between said piston and the clutch mechanism, means adapted to be controlled by the attendant for opening and closing said tubular connection, a sleeve parallel to the axis of said cylinder extending into the chamber of the cylinder located at the side opposite to the part communicating with said manifold, a pipe slidable in said sleeve and having circumferential openings at its inner end and having axially adjustable connection with said piston for being movable therewith into position in which said openings are closed by said sleeve, a check valve in said pipe internally of said holes constructed for permitting the admission of air through said pipe into said chamber, said check valve comprising a ball adapted to be pressed on its seat by the air flowing outwardly through said pipe and a vent extending into said chamber.

5. In a motor vehicle, the combination, with the engine and its manifold, the accelerator, and the clutch mechanism, of a cylinder closed at both ends and having a piston reciprocating therein, a tubular connection between said cylinder at one side of the piston and said manifold, an operative connection between said piston and the clutch mechanism, means adapted to be controlled by the attendant for opening and closing said tubular connection, a pipe extending into the chamber of said cylinder located at the side opposite to the part communicating with said manifold, means operative near the end of the clutch closing stroke of said piston for closing said pipe at its inner end, and a vent communicating with said chamber.

ALFRED MORGAN.